INVENTORS
WALTER M. BOLLEN
GORDON H. GOFF
WILLIAM LEIGH SHORT

BY P.E. Johnston
Jack M. Whitney
ATTORNEYS

INVENTORS
WALTER M. BOLLEN
GORDON H. GOFF
WILLIAM LEIGH SHORT

BY P.E. Johnston
Jack M. Whitney
ATTORNEYS

United States Patent Office 3,335,071
Patented Aug. 8, 1967

3,335,071
AMMONIA RECOVERY PROCESS
Walter M. Bollen, San Rafael, Gordon H. Goff, Lafayette, and William Leigh Short, San Rafael, Calif., assignors to Chevron Research Company, a corporation of Delaware
Filed May 19, 1964, Ser. No. 368,671
10 Claims. (Cl. 203—85)

ABSTRACT OF THE DISCLOSURE

Refinery foul water containing dissolved $NH_3$ and $H_2S$ is freed of these contaminants, and the $NH_3$ and the $H_2S$ are recovered separately, by stripping distillation carried out at superatmospheric pressures in interconnected distillation columns. Hydrogen sulfide vapors are withdrawn overhead from one column, and the bottoms from that column is passed to another column where ammonia vapors are recovered by partially condensing the overhead vapors and returning a portion of the condensate to the first column, withdrawing purified water as bottoms from the second column.

Cross reference

This application is a continuation-in-part of our copending application Serial No. 296,323, filed July 19, 1963, and now abandoned.

Background of the invention

This invention relates to processes for purifying water containing contaminating amounts of ammonia and hydrogen sulfide. In another aspect, the invention relates to processes for removing ammonia and hydrogen sulfide from hydrocarbon hydrogenation process effluent streams.

One object of this invention is to provide a process for separately recovering high purity ammonia from an aqueous solution containing ammonia and hydrogen sulfide formed by reaction of hydrogen with nitrogen compounds and sulfur compounds contained in a hydrocarbon oil when the oil is contacted with hydrogen at reaction conditions, thereby producing a reaction effluent stream containing ammonia and hydrogen sulfide, wherein the reaction effluent is scrubbed with an aqueous stream to remove ammonia and hydrogen sulfide and produce said aqueous solution.

Hydrocarbon oils derived from petroleum and similar sources contain varying amounts of nitrogen compounds and sulfur compounds. In the course of refining the oils it is often desirable to remove such compounds because they impart undesired properties such as disagreeable odor, corrosivity, poor color, and the like to saleable products. In addition, the compounds may have deleterious effects in various catalytic refining processes applied to oils, the nitrogen compounds in particular deactivating certain hydrocracking catalysts and tending to cause excessive gas and coke production in cracking processes. Various schemes have been devised for removing the nitrogen and sulfur compounds from oils, probably the most common and best suited process being catalytic hydrofining wherein the nitrogen and sulfur compounds are converted to $NH_3$ and $H_2S$ by reaction with hydrogen, usually promoted by the use of elevated temperatures and pressures and hydrogenation catalysts. Similar reactions of the nitrogen and sulfur compounds with hydrogen to form $NH_3$ and $H_2S$ also occur in other processes such as thermal and catalytic cracking, reforming, and hydrocracking, which are not specifically designed for this purpose. There are thus produced various reaction effluents containing $NH_3$ and $H_2S$.

The removal of $NH_3$ and $H_2S$ from such hydrocarbon reaction effluent streams may be accomplished by scrubbing with water, preferably at elevated pressure and low temperature. To obtain the desired extent of removal, however, it is often necessary to use a rather large amount of water so that a dilute aqueous solution of $NH_3$ and $H_2S$ is formed. It has been the practice to form solutions so dilute that they can be disposed of as waste waters by discharging into bays, estuaries, rivers, lakes, streams, and ponds. With increasing urbanization and concentration of industrial complexes, however, the situation is rapidly developing where such pollution of water near population centers will no longer be tolerated. The refiner is thus put to considerable expense to dispose of such waste waters either by extreme dilution or by biological oxidation or like treating processes to render the contaminating $NH_3$ and $H_2S$ innocuous to marine life.

It is not possible to recover high yields of high purity $NH_3$ and $H_2S$ by simple distillation of aqueous solutions which contain $H_2S$ in addition to $NH_3$. A stripping type of distillation can be carried out to remove a portion of the $H_2S$ from the solution, but as the residual $H_2S$ concentration in the remaining liquid decreases a limiting minimum ratio of $H_2S$ to $NH_3$ is soon reached at which the relative volatility of $H_2S$ to $NH_3$ is unity, and no further separation between $NH_3$ and $H_2S$ by distillation is possible. The solution still contains nearly all of the $NH_3$ and a substantial contaminating amount of $H_2S$. For example, we have found that even at 450° F. the limiting minimum weight ratio of $H_2S$ to $NH_3$ is above 0.04. At lower temperatures the minimum weight ratio is greater. It does not appear that the $H_2S$ and $NH_3$ can be separated in this way at any feasible temperature. It has been proposed to concentrate such a solution in $NH_3$, to produce ammonium sulfate by adding sulfuric acid, and then to strip the residual $H_2S$ from the acid solution. Many users prefer for chemical and fertilizer purposes, however, to use relatively pure anhydrous ammonia, aqua ammonia, or ammonium salts other than the sulfate.

Summary

In the present invention, $NH_3$ and $H_2S$ can be separately recovered in high purity from aqueous solutions. The $H_2S$ is then in a form which can be readily utilized, e.g., by converting to sulfur or sulfuric acid, and the $NH_3$ is also in a form which finds wide customer acceptance. In accordance with the invention, high purity $NH_3$ and high purity $H_2S$ are separately recovered from an aqueous solution containing both $NH_3$ and $H_2S$ by stripping the solution in a distillation zone to obtain an overhead $H_2S$ vapor product essentially free of $NH_3$, a bottoms water stream containing substantially less $NH_3$ and $H_2S$ than said solution, and an intermediate stream containing more $NH_3$ than $H_2S$ on a weight basis. The intermediate stream is then treated to form an $NH_3$-enriched vapor stream of controlled water content having a higher concentration of $NH_3$ than said intermediate stream. The enriched vapor stream is then partially condensed to form as the uncondensed portion product $NH_3$ vapors essentially free of $H_2S$ and as the condensed portion water containing more $NH_3$ than $H_2S$ on a weight basis and substantially all of the $H_2S$ in the enriched vapor stream. The condensed portion is then further processed in the same manner as above to recover the $H_2S$ and $NH_3$ contained therein, e.g., by recycling the condensed portion to the distillation zone.

The term "stripping" is used herein to characterize the distillation or fractionation as carried out by passing hot vapors or gas generated or introduced at the bottom of multiple-stage contacting columns upwards through descending liquid, whereby the concentration of the most volatile component in the liquid decreases during its descent. The distillation zone comprises one or more such columns and appurtenances conventionally associated therewith.

Figure 1:
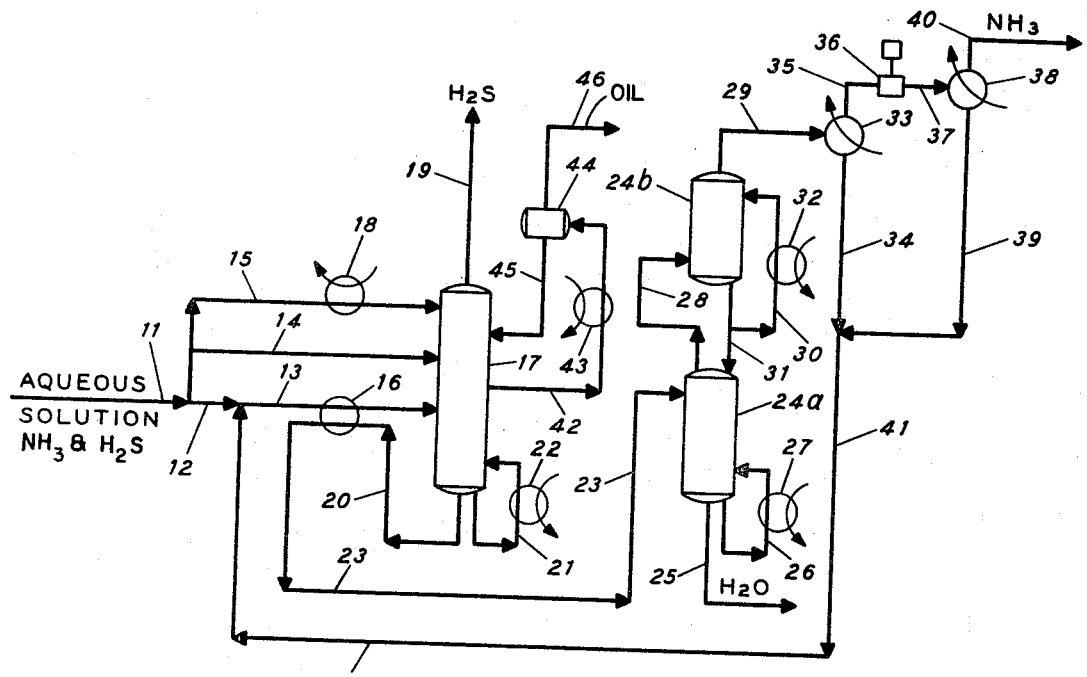
FIGURE 1 is a process flow diagram illustrating flow paths and major equipment items for carrying out the process of this invention in an embodiment wherein the distillation zone comprises two distillation columns, wherein an intermediate stream is treated to form an enriched vapor stream by means of a circulating reflux contacting.

These figures will be discussed in more detail hereinafter.

Detailed description and description of preferred embodiments

The aqueous solution treated in accordance with the invention may contain upwards of 15 weight percent $NH_3$ and upwards of 30 weight percent $H_2S$. More usually the solution is considerably more dilute, containing in the neighborhood of only a few percent of each of $NH_3$ and $H_2S$, but usually about 1 weight percent or more of each. The original ratio of $NH_3$ to $H_2S$ in the aqueous solution is determined primarily by the source of the solution. In an important use of the invention the solution is obtained by scrubbing a reaction effluent containing $NH_3$ and $H_2S$ in a ratio fixed by the relative amounts of nitrogen and sulfur compounds hydrogenated in a hydrocarbon oil, which relative amounts may vary over wide limits, and the aqueous solution formed by scrubbing the reaction effluent with water will, to a certain extent, reflect the ratio originally present in the reaction effluent. The resulting aqueous solution contains preferably from 1 mol percent, up to 5 mol percent, and more preferably up to 2 mol percent of each of $NH_3$ and $H_2S$.

Ammonia and $H_2S$ react in solution, i.e., they are present at least in part as dissolved partially or totally ionized salts. Possible species in the aqueous solution includes $H_2O$, $H^+$, $OH^-$, $NH_3$, $H_2S$, $NH_4^+$, $HS^-$, $S^=$, $NH_4HS$, $(NH_4)_2S$, and hydrates of various of these species. It will be understood that references herein to aqueous solutions of $NH_3$ and $H_2S$ refer to solutions in which many, but not necessarily all, of the above species are present in significant amounts, as clearly the situation where the $NH_3$ and $H_2S$ are both present entirely as free dissolved gases in $H_2O$ does not occur. For convenience, however, the concentrations of nitrogen and sulfur species in the various streams in the process are stated herein as total equivalent $NH_3$ and $H_2S$.

The bisulfide equilibrium appears to play an important role in determining both the absorption in water and the separation possible between $NH_3$ and $H_2S$ from aqueous solutions. The $NH_3$ and $H_2S$ are absorbed readily in water to form ammonium bisulfide ($NH_4HS$), and thereafter additional amounts of $NH_3$ are dissolved more readily than are additional amounts of $H_2S$. Consequently, the aqueous solution will usually contain either almost equal molar amounts of $NH_3$ and $H_2S$ or else more $NH_3$ than $H_2S$, up to 2 mols of $NH_3$ per mol of $H_2S$, corresponding to $(NH_4)_2S$, or more in some cases.

Since $H_2S$ is a particularly undesired purity in $NH_3$, it is desired to produce in the process of the invention a high purity $NH_3$ product essentially free of $H_2S$, i.e., wherein the $H_2S$ concentration is less than 0.5 weight percent. Preferably, the $NH_3$ contains no more than about 1000 p.p.m. $H_2S$, and still more preferably less than about 100 p.p.m. $H_2S$. In the invention it is possible to produce $NH_3$ containing nil or no more than a trace amount of $H_2S$.

It may be noted that whereas in a preferred embodiment of the invention the $NH_3$ is recovered in high purity as a dry vapor stream essentially free of $H_2S$, the high purity spoken of is with reference to freedom from $H_2S$. Thus, it is within the contemplation of the invention to recover a wet $NH_3$ product stream, which would then serve as aqua ammonia, for instance containing about 25 weight percent $NH_3$. In its preferred aspects, however, there is recovered dry product $NH_3$ vapor containing no more than about 2 weight percent water, and more preferably not over 0.5 weight percent water.

Similarly in preferred embodiments of the process of this invention there is recovered $H_2S$ in high purity which is essentially free of $NH_3$. If the $H_2S$ were to be used for producing sulfur, the $NH_3$ content would not be critical but usually is limited to avoid solids formation. At the lower pressures such as for example about 100 p.s.i. the $NH_3$ could be permitted to reach 2% of the $H_2S$. For $H_2SO_4$ production and most other uses, however, the $NH_3$ content is no more than about 100 p.p.m. and the $H_2S$ purity is at least about 95%, the balance being water. Preferably, the $H_2S$ is also recovered in a relatively dry form, containing no more than 1% $H_2O$, more preferably no more than 0.2 weight percent $H_2O$.

Having recovered the $NH_3$ and $H_2S$, there is also obtained a water product which is the greatest proportion of the streams leaving the process, which water preferably contains no more than noncontaminating amounts of $NH_3$ and $H_2S$. When the process is viewed primarily as a means of purifying waste waters to permit their discharge into bays, streams, and the like, what is meant by "noncontaminating amounts" is low concentrations satisfying local regulations. The process is capable of producing a water effluent containing no more than trace amounts of $NH_3$ and $H_2S$. A typical composition for the water product is about 0.03 weight percent $H_2S$ and 0.1 weight percent $NH_3$. Such a water stream can be disposed of directly by dilution in most locations.

In an important embodiment the bottoms water is recycled to absorb additional amounts of $NH_3$ and $H_2S$ from the stream to be purified, in which case the maximum amount of $NH_3$ and $H_2S$ permitted in the bottoms water may sometimes be quite substantial. In such a situation the term "noncontaminating amounts" must be interpreted as means that the concentrations of $NH_3$ and $H_2S$ are low enough so that the desired absorption can be accomplished without instead contaminating the stream to be purified. That is, the $NH_3$ and $H_2S$ contents of the water are permitted to build up to maximum noncontaminating concentrations whereby the stream is purified to the desired extent only by using a relatively larger treating ratio of bottoms water to the stream to be purified. In the usual case at least about 75% of the $NH_3$ and $H_2S$ in the gross aqueous solution to be processed will be removed and recovered as $NH_3$ and $H_2S$ streams of high purity, so that the water product contains substantially less $NH_3$ and $H_2S$ than the initial aqueous solution. One object of the invention is to recover the $NH_3$ and $H_2S$ in high yields, which object is not defeated by permitting appreciable concentrations in a bottoms water stream which reappears in the feed solution. The net recovery or yield of $NH_3$ and $H_2S$ is at least 90% of each, based on the net amounts absorbed to form the aqueous solution.

The vapor pressure of $H_2S$ over aqueous solutions of $NH_3$ and $H_2S$ is quite low at low temperatures if the ratio of ammonia to $H_2S$ is high. Provided the solution is relatively concentrated in $NH_3$, vapors in equilibrium with such a solution will be high purity $NH_3$. If the solution is not concentrated in $NH_3$, the $NH_3$ vapor pressure will also be low, and the vapors in equilibrium with the liquid will not be high purity $NH_3$.

In substance, therefore, the process of the invention is directed toward obtaining from the feed solution a concentrated solution wherein the $NH_3$ concentration is high and the ratio of $NH_3$ to $H_2S$ is high, so that the high purity $NH_3$ vapors in equilibrium therewith can be recovered. In the concentrated solution the ratio of $NH_3$ to $H_2S$ must be greater than 2 to 1 on a weight basis, and must higher ratios in the range between 4 and 10 are preferred. Also, in the concentrated solution, the $NH_3$ concentration must be at least 20% by weight, with higher concentrations of 30–50 weight percent, or even higher, being preferred to limit the $H_2O$ content of the vapors in equilibrium therewith. If the $NH_3$ concentration is in the preferred higher ranges, the $H_2S$ concentration may approach 20% by weight, depending in part on the concentration in the original feed solutions. With dilute feed solutions, the $H_2S$ concentration in the concentrated solution will generally be less than 10 weight percent. In the invention, the desired concentrated solution and equilibrium vapors are obtained by partially condensing an $NH_3$-enriched vapor stream, which must necessarily have an even higher $NH_3$ concentration and higher ratio of $NH_3$ to $H_2S$ than the condensate (desired concentrated solution), and which enriched vapor stream must also have a controlled water content. This enriched vapor stream, however, is also not obtainable by distillation of the aqueous feed solution.

In accordance with the invention, instead of trying to limit the $H_2S$ content in the enriched vapor and condensate to a low concentration, the $H_2S$ is permitted to build up to a concentration between about 5 and 10 weight percent, or up to 20 weight percent in some cases, as mentioned. It is then possible to form the enriched vapor stream by treating an intermediate stream which can be prepared by distillation of the aqueous feed solution. Thus, the intermediate stream is prepared by incompletely stripping $H_2S$ from the aqueous solution only to the extent required to reduce the $H_2S$ concentration to less than the $NH_3$ concentration on a weight basis. More particularly, the weight ratio of $NH_3$ to $H_2S$ in the intermediate stream is at least 2, especially between 3 and 10.

In essence the treatment of the intermediate stream to form the enriched vapor stream involves decreasing the water concentration to a controlled amount. In general, the intermediate stream is obtained as a vapor, and the treatment comprises partially condensing the intermediate vapor at a controlled temperature to obtain as the uncondensed portion enriched vapor containing between about 30 and 75 weight percent water. The higher the $NH_3$ concentration achieved in the enriched vapor, the lower the $H_2O$ concentration can and will be. The $H_2O$, however, should always be present in greater concentration than $H_2S$, preferably at least about 1.5 times as much $H_2O$ as $H_2S$ on a weight basis, so that when the enriched vapor is partially condensed the condensate will readily dissolve substantially all the $H_2S$. Thus, it follows that the $H_2S$ concentration in the enriched vapor will rarely exceed about 20% by weight, and will be less than 20% at $NH_3$ concentrations below 40% and above 50%.

In all cases, the condensate solution, formed by partially condensing the enriched vapor stream to obtain as the uncondensed portion high purity $NH_3$, will contain a substantially amount of $H_2S$ and usually more $NH_3$ than the amount in the recovered vapors. This condensate must, therefore, be further processed to recover the $H_2S$ and $NH_3$ contained therein else the process objective is defeated. This is accomplished by treating the condensate in the same manner as the feed, i.e., by recycling it to the process. In this way the $NH_3$ and $H_2S$ concentrations in the intermediate stream are built up to the high concentrations facilitating forming the enriched vapor stream. Also, the higher the $H_2S$ and $NH_3$ concentrations in these streams, the less the quantity of condensate there is to recycle.

The operation of the process will now be explained with reference to FIGURE 1, illustrating a preferred embodiment of the invention. In FIGURE 1 an aqueous solution containing $NH_3$ and $H_2S$ in line 11 is split into three portions in lines 12, 14 and 15. A portion in line 12 is combined with a recycled stream 41, which has a much higher content of $NH_3$ and $H_2S$, to form a combined feed in line 13, preheated in heat exchanger 16 and introduced to distillation column 17 at an intermediate point. A portion in line 14 is introduced to distillation column 17 at a higher point, and another portion in line 15 is cooled, preferably by refrigeration in heat exchanger 18, and introduced near the top of the distillation column. The temperature at the top of column 17 is thus maintained low enough such that product $H_2S$ vapors essentially free of $NH_3$ can be withdrawn through line 19, preferably low enough so that the vapors in line 19 contain less than 1% $H_2O$. Stripped liquid bottoms containing $NH_3$ and containing $H_2S$ in lesser concentration than $NH_3$ on a weight basis are withdrawn from the bottom of column 17 through line 20. To provide a high temperature at the bottom of the column and to generate upflowing vapors, a portion of the bottoms is passed via line 21 through reboiler 22 and returned to the bottom of the column. The stripped liquid bottoms in line 20 is cooled by heat exchange in exchanger 16, and the cooled stream, renumbered 23, is passed into a second distillation column 24a. The stripped liquid bottoms are further stripped in column 24a to obtain a bottoms liquid water stream in line 25 containing substantially less $NH_3$ and $H_2S$ than the original aqueous solution in line 11. A portion of the water is passed via line 26 through reboiler 27 to provide a high temperature at the bottom of column 24a and to generate upflowing vapors. Overhead of column 24a there is obtained an intermediate vapor stream 28, containing more $NH_3$ than $H_2S$ on a weight basis in a ratio usually not markedly different from that in line 23. This intermediate stream is treated to enrich it in ammonia content in distillation section 24b by countercurrent contact with liquid introduced at the top of section 24b through line 30. Line 30 is a major portion of the downflowing liquid in line 31 passing from section 24b to 24a, which portion in line 30 is cooled by passing through heat exchanger 32. The amount of cooling and the rate of circulating liquid through line 30 are controlled so as to produce an enriched vapor stream in line 29 having a higher concentration of $NH_3$ than intermediate stream 28. More particularly, the vapor in line 29 contains $NH_3$ and $H_2S$ in a ratio usually not markedly different from that in lines 28 and 23, but the water content in line 29 is reduced to a controlled concentration by controlling the temperature at the top of section 24b. The enriched vapor in line 29 is then partially condensed in condenser 33 to form a condensate in line 34 containing more $NH_3$ than $H_2S$ on a weight basis and subsequently all of the $H_2S$ originally present in stream 29, whereby the uncondensed portion in line 35 comprises $NH_3$ vapors substantially free of $H_2S$. In the embodiment shown the $NH_3$ vapors are still further purified by raising the pressure by means of compressor 36 and passing the vapors at high pressure in line 27 to partial condenser 38, wherein much of the residual water is condensed to form a condensate in line 39 containing more $NH_3$ than $H_2S$ on a weight basis and the major portion of any residual $H_2S$ in the vapors of line 35, thereby producing $NH_3$ vapors of higher purity in line 40. The condensates 34 and 39, containing $NH_3$ and substantially all of the $H_2S$ previously present in the stripped liquid bottoms of column 17 not removed in line 25, are combined to form recycle stream 41. As previously described, this recycle stream is combined with the fresh feed and returned to distillation column 17.

In the embodiment shown in FIGURE 1, section 24b may be mounted directly upon and form an integral part of a single distillation column composed of sections 24a and 24b. In that case there would be no actual withdrawal of intermediate stream 28, that stream representing the vapors passing upwards into the tray of section 24b from which liquid is withdrawn, as by line 30, for cooling and circulating to the top of the column. In essence, section 24b acts as a partial condenser wherein the conditions are controlled to form uncondensed vapor, enriched in $NH_3$ concentration, and condensate which is returned to section 24a, whereby the uncondensed vapor in line 29 contains substantially all the $H_2S$ previously contained in the stripped liquid bottoms of line 20 and 23 not removed in the bottoms liquid water stream 25. The vapor in line 29 contains a controlled amount of water relative to $NH_3$ such that in the subsequent stages of partial condensation in condensers 33 and 38 condensate can be produced in lines 34 and 39 having a high $NH_3$ vapor pressure and a low vapor pressure of $H_2O$ and $H_2S$. Partial condensation to produce the product $NH_3$ vapor can be in multiple stages, as indicated, or in a single stage. For instance, if the enriched vapor in line 29 were compressed ahead of condenser 33, the subsequent condensation in 38 could be omitted. The selection is primarily made by comparing compression costs vs. condenser costs.

Typical and preferred operating conditions in the process, with reference to the embodiment of FIGURE 1, include the use of superatmospheric pressures in columns 17 and 24a and 24b, preferably in the range between 20 and 150 p.s.i.g., and rarely above 400 p.s.i.g. The temperature at the top of column 17 is below about 100° F., and preferably about 60° F. The temperature at the bottom of column 17 is fixed substantially by the pressure employed, but will be between 210° F. and about 450° F., preferably between about 275° F. and 365° F. Generally, the pressure in column 24a and the temperature at the bottom thereof are somewhat lower than those in column 17, but in the same order of magnitude. Although higher pressures in column 24a are advantageous in obtaining high purity $NH_3$ with less recycle, operation can be at conditions at which low pressure steam can be employed in the reboilers. The partial condensations in condensers 33 and 38 are preferably at temperatures between 60° F. and 150° F. to permit cooling with water. Preferred $NH_3$ to $H_2S$ ratios and $NH_3$ concentrations in the enriched vapor, as set forth previously herein, are with reference to condensation in this temperature range. The use of refrigeration in the condensers may be advantageous in some cases.

When the aqueous solution is obtained by scrubbing a hydrocarbon reaction effluent stream containing $NH_3$ and $H_2S$, the aqueous solution may contain some dissolved or entrained oil. To prevent any of this oil appearing in the products, it may be removed as shown in FIGURE 1 by withdrawing a liquid stream from the first distillation column 17 as by line 42, cooling in heat exchanger 43 and passing to a settling vessel 44. The oil will then concentrate at this point and may be skimmed off and removed through line 46, and oil-free water solution being returned to the distillation column in line 45. The best location for oil skimming facilities depends on the nature of the oil. When located in the upper portion of the column, as in FIGURE 1, the facilities serve the added purpose of helping to control the overhead temperature.

Figure 2:
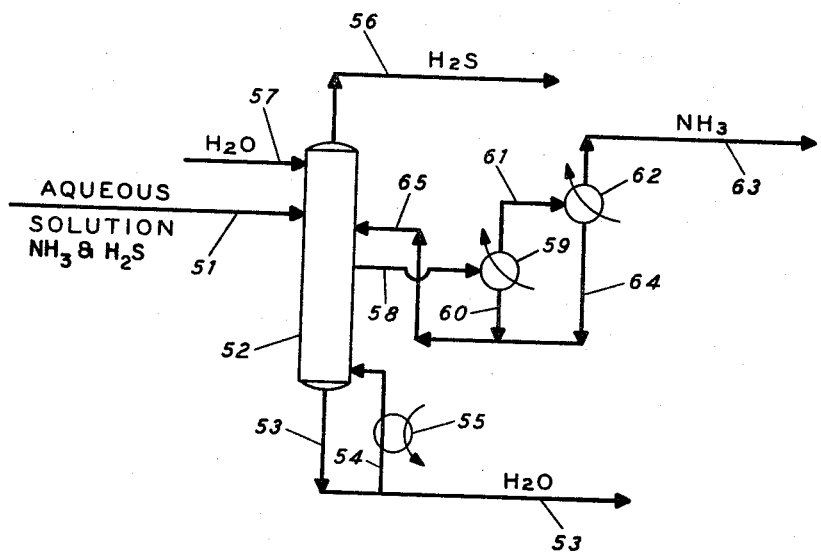
FIGURE 2 is another flow diagram illustrating an embodiment of the invention wherein a single distillation column is used, and an intermediate stream is treated to form an enriched vapor stream by partial condensation.

In the embodiment shown in FIGURE 2, an aqueous solution containing $NH_3$ and $H_2S$ is introduced by line 51 into single distillation column 52, which operates at superatmospheric pressure. Hot upflowing vapors are generated at the bottom of column 52, and an overhead $H_2S$ product vapor essentially free of $NH_3$ is obtained in line 56. The temperature at the top of column 52 is maintained sufficiently low such that the vapor has the desired purity. A wash water stream is introduced at the top of the column through line 57 to assist in the removal of $NH_3$ and to effect cooling. Liquid is withdrawn from the bottom of the column through line 53. This liquid comprises water containing no more than noncontaminating amounts of $H_2S$ and $NH_3$, a situation which is accomplished by generating stripping vapors at the bottom of the column by passing a portion of the bottoms via line 54 through reboiler 55. A vapor side stream is withdrawn from the column through line 58 at a point such that this intermediate side stream contains more $NH_3$ than $H_2S$ on a weight basis. This side stream is treated to form an enriched vapor stream by partially condensing in condenser 59 at conditions controlled to give an enriched vapor stream in line 61 of controlled water content, and a condensate in line 60 containing more $NH_3$ than $H_2S$. The enriched vapor stream in line 61 is then partially condensed in condenser 62 to form as the uncondensed portion $NH_3$ vapor essentially free of $H_2S$, withdrawn through line 63, and as the condensed portion water containing $NH_3$ and substantially all of the $H_2S$ in the enriched stream 61. The condensed portion obtained in line 64 is admixed with the condensate of line 60 to form a recycle condensate in line 65, which is returned to the distillation column for recovery of the $H_2S$ and $NH_3$ contained therein. Streams 64 and 60 may be returned to the distillation column at different points, or they may be combined as shown and returned to the column, preferably above the point of withdrawing the intermediate side stream 58.

Figure 3:
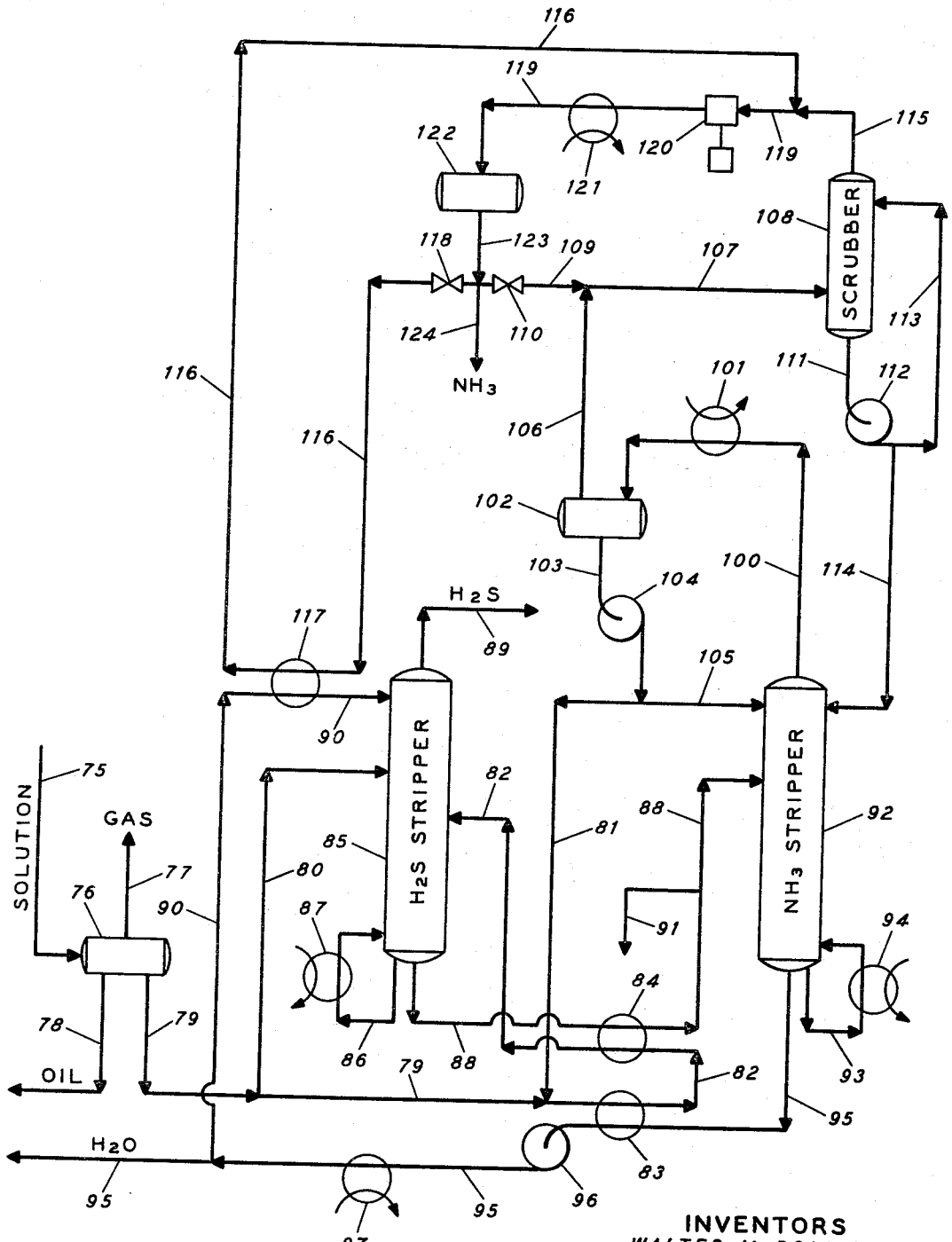
FIGURE 3 is another flow diagram illustrating a two-column embodiment of the invention wherein a major fraction of the condensed portion formed by partially condensing an ammonia-enriched-vapor stream is utilized as cold reflux to treat an intermediate stream in the second column and form the $NH_3$ enriched vapor, and a minor fraction of the condensed portion is passed to the first column.

In the embodiment shown in FIGURE 3, an aqueous solution of $NH_3$ and $H_2S$ is separated into its constituent components by stripping $H_2S$ from the solution in a first distillation column which is operated at superatmospheric pressure. A low temperature is maintained at the top to provide essentially pure $H_2S$ vapors overhead, and a high temperature is maintained at the bottom to provide stripped liquid bottoms water containing more $NH_3$ than $H_2S$ on a weight basis. The stripped liquid bottoms water is passed to a second distillation column at a point near the top thereof. The second column is also operated at superatmospheric pressure with high temperature at the bottom providing as the bottoms product water essentially free of $NH_3$ and $H_2S$. The ammonia enriched vapor stream is formed in the second column by partially condensing the overhead vapors at a temperature substantially below the overhead vapor temperature and returning the major portion of the resulting condensate as reflux to the top of the column. In this way, up-flowing intermediate vapors below the top of the column are enriched in $NH_3$ concentration by condensation of water such that the overhead vapor, when partially condensed, provides an uncondensed portion which is predominantly $NH_3$. The other, minor, portion of the resulting condensate is returned to the first distillation column. In the embodiment shown, the uncondensed portion is again partially condensed to separate $H_2O$ and $H_2S$ contained therein from essentially pure $NH_3$ vapors.

Referring now to FIGURE 3, by way of example, an aqueous solution containing 4.4 weight percent $H_2S$ and 3.1 weight percent $NH_3$ is obtained by scrubbing a hydroconversion process effluent stream, comprising hydrocarbons, hydrogen, ammonia, and hydrogen sulfide, with water. The solution is passed via line 75 to degassing and oil separation drum 76. Dissolved gases which weather off are removed via line 77, and entrained oil which separates out is withdrawn through line 78. The aqueous solution is withdrawn through line 79, and a major portion thereof is combined with a recycled concentrated solution in line 81 to form a combined feed in line 82, which is preheated in heat exchangers 83 and 84 and then introduced into $H_2S$ stripper column 85 at about 260° F. The concentrated solution in line 81 is about 50 weight percent $NH_3$ and 16.5 weight percent $H_2S$, balance $H_2O$, and amounts to about 8% of the material in line 82. As shown, a minor portion, about ¼, of the aqueous solution in line 79 is passed through line 80 and introduced further up in column 85 at a lower temperature. Column 85 operates at about 120 p.s.i.g. with a bottoms temperature of about 320° F., maintained with substantial boil-up by passing a portion of the bottoms via line 86 through reboiler 87. The stripped liquid bottoms of column 85 withdrawn through line 88 contains about 1 weight percent $H_2S$ and 6 weight percent $NH_3$. From the top of column 85 overhead vapors consisting essentially of $H_2S$ containing only 0.1 weight percent $H_2O$ and less than 100 p.p.m. $NH_3$ are withdrawn through line 89 at about 60° F. The lower temperature is achieved by introducing at the top through line 90 water chilled to about 45° F. The stripped liquid bottoms in line 88 is cooled in heat exchanger 84 and then introduced into ammonia stripper column 92 at about 270° F. As indicated, a minor portion of this stream may be withdrawn through line 91. This may be used as a scrubbing solution to absorb additional $H_2S$ from the reaction effluent (not shown) or from another stream, returning to the process in line 75. Column 92 operates at a pressure of about 60 p.s.i.g. with a temperature of 307° F. at the bottom, maintained with substantial boil-up by passing a portion of bottoms via line 93 through reboiler 94. There is thus withdrawn as the bottoms product through line 95 water containing not over 0.01 weight percent $H_2S$ and not over 0.03 weight percent $NH_3$. As indicated, the hot bottoms in line 95 is used to preheat the original aqueous solution in heat exchanger 83, and is passed by pump 96 through cooler 97. A portion of the cooled water is passed through line 90 and further refrigerated in heat exchanger 117 to provide the low temperature at the top of column 85 and prevent carryover of water and ammonia. The remainder of the water in line 95, comprising essentially the net amount of water entering in line 75, is withdrawn for reuse or disposal as desired.

It is desired to obtain overhead from column 92 an $NH_3$ enriched vapor which can be partially condensed to provide high purity $NH_3$ as the uncondensed portion. This is done by refluxing through line 105 a concentrated solution of the same concentration as the material in line 81 (50% $NH_3$ and 16.5% $H_2S$). This reflux solution is provided at a temperature of about 100° F., and serves to condense water from the upflowing vapors rising above the point of introducing the stream in line 88. There is thus obtained overhead in line 100 at about 240° F. an enriched vapor which is about 57 weight percent $NH_3$, 14 weight percent $H_2S$ and 29 weight percent $H_2O$. When cooled to 100° F. at 50 p.s.i.g. by passing through heat exchanger 101, 85% of the material condenses and is collected in drum 102. The condensed material is withdrawn through line 103 and passed by pump 104 partly through line 81 (about ⅓) for return via line 82 to column 85, and partly through line 105 (about ⅔) for reflux to column 92. The uncondensed portion is predominantly $NH_3$, containing about 1.6 weight percent $H_2O$ and about 0.8 weight percent $H_2S$, and is withdrawn through line 106. For further purification, the uncondensed portion is passed via line 107 to scrubber 108. A lower temperature of about 45° F. is maintained in scrubber 108 by adding to the vapor passed thereto essentially pure $NH_3$ at a temperature of about 30° F. in line 109. The $NH_3$ is line 109 is principally liquid, but partially vaporized, the low temperature having been obtained by expanding liquid $NH_3$ from a higher pressure through valve 110. In scrubber 108 a high circulation of liquid is maintained by taking liquid from the bottom through line 111 and pumping it around with pump 112 through line 113 to the top of the scrubber. The net amount of material condensed by cooling the vapor of line 106 to the lower temperature of scrubber 108 is withdrawn through line 114 and returned to one of the distillation columns, for example, to the top of column 92 as shown. At the conditions of the example, this stream in line 114 is comprised of 73% $NH_3$, 10% $H_2S$, balance water, and amounts to less than 10% of the vapor of line 106. The vapor effluent of scrubber 108 in line 115 is thus essentially pure $NH_3$, containing about 0.24 weight percent $H_2O$ and less than 100 p.p.m. $H_2S$. This ammonia vapor is combined in line 119 with a portion of ammonia vapor from line 116. The mixture in line 119 is compressed in compressor 120 to about 200 p.s.i.g., condensed in heat exchanger 121 at about 100° F., and the condensed liquid ammonia is recovered in drum 122. From drum 122 the ammonia is continuously withdrawn through line 123. A portion is flashed through valve 110 into line 109, as previously described, to provide refrigeration in scrubber 108. Another portion is flashed through valve 118 to provide refrigerant ammonia in line 116 which is utilized in heat exchanger 117 to cool the water in line 90. The net recovery of $NH_3$ is withdrawn through line 124. Thus, the $NH_3$, the $H_2S$, and $H_2O$ are each separately recovered virtually quantitatively and essentially free of the other constituents.

By way of further example, when 16,500 barrels per day of heavy California gas oils containing nitrogen compounds and sulfur compounds are converted to lower-boiling fuels by a combination of catalytic hydrofining and catalytic hydrocracking, there is produced about 26 tons per day of $H_2S$ and about 12 tons per day of $NH_3$. The bulk of this $NH_3$ and $H_2S$ is produced by hydrogenation of nitrogen compounds and sulfur compounds in the hydrofining stage, at temperatures between 600° F. and 900° F. and pressures between 1000 and 3000 p.s.i.g., to prepare a purified oil feed for the hydrocracking stage. It is desired to remove the $NH_3$ from the purified oil quantitatively because the $NH_3$ has a deleterious effect on the hydrocracking catalyst. It is also desired to remove the $NH_3$ and $H_2S$ to increase the purity of recycle hydrogen to the hydrofining stage and to the hydrocracking stage. The $NH_3$ and most of $H_2S$ can be removed by scrubbing the mixture of hydrogen and hydrofined oil effluent of the hydrofining reactor with water, most advantageously at the high pressure employed in the hydrofining stage and at a lower temperature. At least a portion of the water is usually injected into the effluent stream before it is completely cooled, to avoid the possibility of solid ammonium sulfide forming and depositing in the heat exchangers and lines. The following example illustrates the use of this invention in recovering separately the $NH_3$ and $H_2S$ from the water.

EXAMPLE

The hydrofining reactor effluent comprising about 3–4 million cubic feet per hour of hydrogen and 16,500 barrels per day of hydrogenated oil is cooled to about 130° F. at reactor pressure of about 1500–2000 p.s.i.g. and scrubbed with 85,000 pounds per hour of water containing 0.034% $H_2S$ and 0.12% $NH_3$. There is thus obtained an aqueous solution containing 2.3 weight percent $H_2S$ and 1.2 weight percent $NH_3$. The aqueous solution is separated from the oil and gas, which then contain only traces of $NH_3$, and then passed to a distillation column wherein the pressure is 85 p.s.i.g. Of conservative design, the column comprises 30 sieve trays, 4 feet in diameter. A temperature of 310° F. is maintained at the bottom of the column and a temperature of 60° F. is maintained at the top of the column. A major portion of the aqueous solution is introduced to the column below the midpoint preheated to about 240° F.; a minor portion is introduced above the mid-point of the column at about 100° F.; and a still smaller portion, about 2%, is chilled to 45° F. and introduced at the top. A recycle stream amounting to 5¼% of the feed is introduced into the column with the portion of feed which was preheated to 240° F. This recycle stream is composed of condensate obtained by partial condensation of an $NH_3$ enriched vapor stream formed as hereinafter described and analyzes 38 weight percent $NH_3$ and 7.4 weight percent $H_2S$. With vigorous stripping in the distillation column there is obtained a stripped liquid bottoms water stream analyzing 3 weight percent $NH_3$ and 0.4 weight percent $H_2S$, the balance being water. Overhead of the column there is withdrawn 2000 pounds per hour of product $H_2S$ vapors containing only about 0.15 weight percent $H_2O$ and less than 100 parts per million of $NH_3$.

The stripped liquid bottoms of the first column obtained at 310° F. is cooled to 240° F. and passed to a second distillation column operating at 30 p.s.i.g. This column has 25, four-foot diameter, trays. The temperature at the bottom of the second column is 274° F., and with vigorous boilup there is obtained from the bottom water product containing 0.12 weight percent $NH_3$ and 0.034 weight percent $H_2S$. This water is recycled and utilized as the water stream for scrubbing the reaction effluent to form thereby the aqueous solution forming the feed to the first distillation column.

At a point in the second column above the feed tray there is obtained an intermediate vapor stream which is 40 weight percent $NH_3$, 5 weight percent $H_2S$, and the balance water. From the tray above this intermediate vapor there is withdrawn liquid at the rate of 355 gallons per minute at a temperature of 240° F. This liquid stream is cooled to 150° F. and returned to the top of the second distillation column, three to five trays above the point of withdrawal. As this liquid flows downward countercurrent to the upflowing intermediate stream, an enrichment in $NH_3$ and $H_2S$ relative to $H_2O$ in the upflowing vapor is accomplished, whereby there is obtained overhead of the second distillation column an enriched vapor stream, which is 49 weight percent $NH_3$ and 6 weight percent $H_2S$ at a temperature of 225° F. and a pressure of 25 p.s.i.g. This enriched vapor stream is cooled to 100° F. at 20 p.s.i.g. to effect partial condensation thereof, whereby there is obtained a condensate which is 38 weight percent $NH_3$ and 7.4 weight percent $H_2S$, in $H_2O$, and an uncondensed portion which is 96.8 weight percent $NH_3$, 2.9 weight percent $H_2O$, and 0.3 weight percent $H_2S$. This $NH_3$ vapor stream is then compressed to 75 p.s.i.g. and again cooled to 100° F. to effect partial condensation, whereby there is obtained a small amount of condensate, which is 52 weight percent $NH_3$ and 4.3 weight percent $H_2S$. The condensates are combined and returned to the first column as the aforementioned recycle stream. The 980 pounds per hour of uncondensed vapor obtained from this partial condensation consists essentially of $NH_3$, having specifically a composition of 99 weight percent $NH_3$, about 1 weight percent $H_2O$, and less than 0.1 weight percent $H_2S$. Although this $NH_3$ vapor product is acceptable for nearly all purposes, it is further purified by scrubbing with 30 gallons per day of 25° Bé caustic to remove the small amount of $H_2S$ as sodium sulfide and also to accomplish partial drying of the $NH_3$, whereby there is obtained 975 lbs. per hour of an $NH_3$ product which is 99.5% $NH_3$ and contains no more than a trace amount of sulfur.

Thus, both the $NH_3$ and the $H_2S$ are separately recovered quantitatively at purities of 99% or better. The quantitative recovery is possible because the bottoms stream from the second column, containing noncontaminating amounts of $NH_3$ and $H_2S$, is recycled to absorb additional $NH_3$ and $H_2S$, and is then returned to be processed. There is no waste water to dispose of. If this bottoms stream were disposed of as noncontaminating waste water, the $NH_3$ and $H_2S$ recoveries would be, respectively, 90% and 99% at the conditions used in the above example. More complete recovery of the $NH_3$ would be possible, because the water product leaving the process could be more completely purified by using a more vigorous stripping in the second column.

If there is a net addition of water to the process, as may occur if water is injected to cool the overhead of the first column and help keep the $NH_3$ out of the $H_2S$ vapor product, or if live steam is injected into one or both columns for stripping, this water must be withdrawn in at least one of the streams, preferably by bleeding off a minor portion of the bottoms stream from the second column.

There may be some special situations where the composition of the initial aqueous solution to be treated would be such that an enriched vapor stream having a sufficiently high ratio of $NH_3$ to $H_2S$ and a sufficiently high $NH_3$ concentration could be obtained directly by simple distillation, whereby by partial condensation the desired high purity $NH_3$ vapors could be recovered. It is believed that even in such rare situations, if they exist, the process of the present invention will prove to be a much more convenient, practical, and efficacious method of recovering high purity $NH_3$.

The foregoing process flow diagrams of FIGURES 1, 2, and 3, differ from one another in several respects. Certain features of each may be incorporated in the other and/or substituted for other features in a manner which will be obvious from the description of operating principles herein. Similarly, other equivalent means for accomplishing the process steps of the invention will become apparent to persons skilled in the art. Accordingly, all such equivalent means and embodiments of the invention as fall within the scope of the appended claims are intended to be embraced thereby.

We claim:
1. A process for recovering high purity ammonia from an aqueous solution containing both $NH_3$ and $H_2S$, in a distillation zone, which comprises:
   (1a) stripping said solution in the distillation zone at superatmospheric pressure to form hot upflowing vapors comprising water, $NH_3$ and $H_2S$, which vapors are contacted countercurrently therein with downflowing colder liquid water,
   (1b) withdrawing overhead vapor from the distillation zone, said vapor comprising $H_2S$ essentially free of $NH_3$,
   (1c) withdrawing bottoms liquid from the distillation zone, said liquid comprising essentially water containing substantially less $NH_3$ and $H_2S$ than said solution; and
   (1d) thereby forming an intermediate vapor stream comprising water, $NH_3$ and $H_2S$, containing more $NH_3$ than $H_2S$ on a weight basis;
   (2) treating said intermediate vapor stream as by partial condensation to form an $NH_3$-enriched vapor stream of controlled water content having a higher concentration of $NH_3$ than said intermediate vapor stream, returning the resulting condensate to the distillation zone; and
   (3) partially condensing said $NH_3$-enriched vapor stream to form an uncondensed portion comprising $NH_3$ vapors essentially free of $H_2S$ and a condensed portion comprising water containing more $NH_3$ than $H_2S$ on a weight basis, returning said condensed portion to the distillation zone;
   (4) controlling the water content of the $NH_3$-enriched vapor stream formed by the treatment of the intermediate vapor stream whereby the condensed portion formed by the partial condensation of the $NH_3$-enriched vapor stream dissolves substantially all of the $H_2S$ present in said $NH_3$-enriched vapor stream.
2. Process according to claim 1 wherein:
   said distillation zone comprises two distillation columns, in each of which columns an aqueous solution containing both $NH_3$ and $H_2S$ is partially vaporized by heating near the column bottom and upflowing vapors are partially condensed by cooling near the column top;
   said vapor comprising $H_2S$ essentially free of $NH_3$ is withdrawn overhead from a first column, and aqueous liquid bottoms from that column, containing more $NH_3$ than $H_2S$ on a weight basis, is passed to the second column;
   said liquid comprising essentially water containing substantially less $NH_3$ and $H_2S$ than said solution is withdrawn as bottoms liquid from said second column;

overhead vapors of said second column are partially condensed, and at least a portion of the resulting condensate is passed to said first column.

3. Process according to claim 2 wherein overhead vapors of said second column are treated as said intermediate vapor stream, which is partially condensed to form said $NH_3$-enriched vapor stream, the resulting condensate is returned to said second column, and the condensed liquid portion formed by the subsequent partial condensation of said $NH_3$-enriched vapor stream is passed to said first column.

4. Process according to claim 2 wherein upflowing vapors in the upper portion of said second column, above the point where aqueous liquid bottoms of the first column is introduced, are treated as said intermediate vapor stream, and said $NH_3$-enriched vapor stream is formed as the overhead vapor stream from said second column by contacting said upflowing vapors countercurrently in the column with cooled reflux which is recirculated through the upper portion of said column.

5. Process according to claim 2 wherein $H_2S$ is stripped from said aqueous solution in said first column to the extent that the aqueous liquid bottoms therefrom contains more $NH_3$ than $H_2S$ in a weight ratio between 3 and 10.

6. Process according to claim 2 wherein the water content of said $NH_3$-enriched vapor stream is controlled in the range between 30 and 75% water.

7. Process according to claim 2 wherein upflowing vapors in the upper portion of said second column, above the point where liquid bottoms of the first column is introduced, are treated as the intermediate vapor stream, said $NH_3$-enriched vapor stream is formed as the overhead vapor stream from said second column by partially condensing said column overhead vapor stream at a temperature substantially below the overhead vapor temperature and returning a major portion of the condensed liquid portion thereby formed to the second column as top reflux, thereby enriching the upflowing vapors in $NH_3$ concentration, and the other minor portion of said condensed liquid is passed to the first column.

8. A process for recovering byproduct $NH_3$ and $H_2S$ produced in refining treatments applied to petroleum fractions and like hydrocarbon oils wherein hydrocarbon oil containing organic sulfur and nitrogen compounds is contacted with hydrogen at reaction conditions at which hydrogen reacts with said compounds to form $NH_3$ and $H_2S$ and there is obtained a reaction effluent stream containing $NH_3$ and $H_2S$, which comprises (1) contacting said reaction effluent stream with a water stream at conditions at which $NH_3$ and $H_2S$ dissolve in the water forming a water solution containing ammonium bisulfide; (2) passing said solution to a distillation zone comprising first and second distillation columns operated at superatmospheric pressures of 20–400 p.s.i.g.; (3) separately removing $NH_3$ and $H_2S$ from said solution in the distillation zone by: (a) heating near the bottom of each column generating hot upflowing vapors of $NH_3$, $H_2S$, and $H_2O$, (b) cooling near the top of the first column, providing downflowing liquid water and forming as overhead vapor $H_2S$ essentially free of $NH_3$, (c) withdrawing said overhead vapor, (d) passing aqueous liquid bottoms from the first column to the second column, said liquid bottoms comprising water containing more $NH_3$ than $H_2S$ in a weight ratio of at least 3, (e) withdrawing water containing substantially less $NH_3$ and $H_2S$ than said solution as bottoms liquid from the second column, (f) partially condensing overhead vapors of the second column by cooling, forming uncondensed vapor which is $NH_3$ essentially free of $H_2S$ and condensed liquid which is a concentrated solution of at least 20% $NH_3$ in $H_2O$ containing more $NH_3$ than $H_2S$ on a weight basis, (g) withdrawing said uncondensed vapor, (h) returning part of the condensed liquid as cold reflux near the top of the second column, and (i) passing another part of the condensed liquid to the first column; and (4) reusing at least a portion of the bottoms liquid from the second column in the water stream for contacting said reaction effluent stream.

9. The process which comprises passing an aqueous feed solution of $NH_3$ and $H_2S$ and an aqueous recycle solution of $NH_3$ and $H_2S$ to a first distillation column between the top and bottom thereof;

in said first column maintaining a superatmospheric pressure of 20–400 p.s.i.g., introducing cold water near the top, generating hot unflowing vapors comprising $H_2O$, $NH_3$, and $H_2S$ by reboiling bottoms liquid, withdrawing overhead vapors comprising $H_2S$ essentially free of $NH_3$, and withdrawing bottoms liquid comprising water containing more $NH_3$ than $H_2S$ in a weight ratio between 3 and 10;

passing bottoms liquid withdrawn from the first distillation column to a second distillation column;

in said second column maintaining a superatmospheric pressure of 20–400 p.s.i.g., introducing cold reflux liquid near the top, generating hot upflowing vapors by reboiling bottoms liquid, withdrawing overhead vapors comprising $H_2O$, $NH_3$, and $H_2S$, and withdrawing bottoms liquid comprising essentially $H_2O$;

cooling overhead vapors of the second distillation column to a temperature at which substantially all the water vapor therein condenses, dissolving part of the $NH_3$ and substantially all of the $H_2S$ leaving an uncondensed portion which is predominantly $NH_3$;

returning a major portion of the condensed water with dissolved $NH_3$ and $H_2S$ to the second column as said cold reflux liquid, thereby enriching upflowing vapors near the top of the column in $NH_3$, and passing the remaining portion of the condensed water with dissolved $NH_3$ and $H_2S$ to the first column as said aqueous recycle solution.

10 The process of claim 9 wherein said uncondensed portion which is predominantly $NH_3$ is again partially condensed to separate $H_2O$ and $H_2S$ contained therein from essentially pure $NH_3$ vapors which are recovered, and the condensed portion is returned to one of said distillation columns.

References Cited
UNITED STATES PATENTS

| | | | |
|---|---|---|---|
| 1,360,734 | 11/1920 | Doherty | 23—181 X |
| 1,953,478 | 4/1934 | Hausen | 23—225 |
| 2,029,262 | 1/1936 | Hausen | 23—225 |
| 2,106,734 | 2/1938 | Gollmar | 23—193 X |
| 2,162,838 | 6/1939 | Cole et al. | 23—181 X |
| 2,200,400 | 5/1940 | Sollner | 23—193 |
| 2,837,398 | 6/1958 | Grosskinsky et al. | 55—73 |
| 3,030,182 | 4/1962 | Gollmar | 23—181 |
| 3,035,900 | 5/1962 | Gollmar | 23—181 |
| 3,104,959 | 9/1963 | Grosskinsky et al. | 55—70 |

FOREIGN PATENTS

| | | |
|---|---|---|
| 743,088 | 5/1943 | Germany. |
| 694,773 | 7/1953 | Great Britain. |

NORMAN YUDKOFF, *Primary Examiner.*

F. E. DRUMMOND, *Assistant Examiner.*